US010026186B2

(12) United States Patent
Gerganov et al.

(10) Patent No.: US 10,026,186 B2
(45) Date of Patent: Jul. 17, 2018

(54) SINGLE- AND MULTI-MODALITY ALIGNMENT OF MEDICAL IMAGES IN THE PRESENCE OF NON-RIGID DEFORMATIONS USING PHASE CORRELATION

(71) Applicant: ViewRay Technologies, Inc., Oakwood Village, OH (US)

(72) Inventors: Georgi Gerganov, Sofia (BG); Iwan Kawrakow, Cleveland, OH (US)

(73) Assignee: ViewRay Technologies, Inc., Oakwood Village, OH (US)

( * ) Notice: Subject to any disclaimer, the term of this patent is extended or adjusted under 35 U.S.C. 154(b) by 341 days.

(21) Appl. No.: 14/559,880

(22) Filed: Dec. 3, 2014

(65) Prior Publication Data

US 2015/0154756 A1 Jun. 4, 2015

Related U.S. Application Data

(60) Provisional application No. 61/911,379, filed on Dec. 3, 2013.

(51) Int. Cl.
*G06K 9/36* (2006.01)
*G06T 7/20* (2017.01)
*G06T 7/30* (2017.01)
*G06T 7/32* (2017.01)

(52) U.S. Cl.
CPC ............ *G06T 7/20* (2013.01); *G06T 7/30* (2017.01); *G06T 7/32* (2017.01); *G06T 2207/10072* (2013.01); *G06T 2207/20016* (2013.01)

(58) Field of Classification Search
None
See application file for complete search history.

(56) References Cited

U.S. PATENT DOCUMENTS

| 6,005,916 | A | 12/1999 | Johnson et al. |
| 6,636,645 | B1 | 10/2003 | Yu et al. |
| 7,092,573 | B2 | 8/2006 | Luo et al. |
| 7,202,663 | B2 | 4/2007 | Huang |
| 7,230,429 | B1 | 6/2007 | Huang et al. |
| 7,265,545 | B2 | 9/2007 | Kruger et al. |
| 7,532,705 | B2 * | 5/2009 | Yin ............... A61B 6/025 378/22 |
| 7,542,622 | B1 | 6/2009 | Angelini et al. |
| 7,659,718 | B1 | 2/2010 | Lustig |
| 7,791,338 | B2 | 9/2010 | Kim |

(Continued)

FOREIGN PATENT DOCUMENTS

WO WO-2003/008986 A2 1/2003

OTHER PUBLICATIONS

Yoon et al. ("Accuracy of an Automatic Patient-Positioning System Basedon the Correlation of Two Edge Images in Radiotherapy",Journal of Digital Imaging, vol. 24, No. 2 (Apr. 2011): pp. 322-330).*

(Continued)

*Primary Examiner* — Randolph I Chu
(74) *Attorney, Agent, or Firm* — Pillsbury Winthrop Shaw Pittman LLP

(57) ABSTRACT

A phase correlation method (PCM) can be used for translational and/or rotational alignment of 3D medical images even in the presence of non-rigid deformations between first and second images of a registered volume of a patient.

17 Claims, 10 Drawing Sheets

(56) References Cited

U.S. PATENT DOCUMENTS

| | | | |
|---|---|---|---|
| 7,840,045 | B2 | 11/2010 | Guo et al. |
| 8,155,417 | B2 | 4/2012 | Piron et al. |
| 8,310,233 | B2 | 11/2012 | Trzasko et al. |
| 9,472,000 | B2 | 10/2016 | Dempsey |
| 2003/0068097 | A1 | 4/2003 | Wilson et al. |
| 2004/0054248 | A1* | 3/2004 | Kimchy ............... A61B 5/055 600/3 |
| 2005/0197564 | A1 | 9/2005 | Dempsey |
| 2005/0207531 | A1 | 9/2005 | Dempsey et al. |
| 2006/0120583 | A1* | 6/2006 | Dewaele ............. G06T 3/0068 382/128 |
| 2007/0083114 | A1 | 4/2007 | Yang et al. |
| 2007/0230770 | A1* | 10/2007 | Kulkarni ............ G06F 17/5045 382/149 |
| 2008/0197842 | A1 | 8/2008 | Lustig et al. |
| 2009/0039886 | A1* | 2/2009 | White .................... G01R 33/28 324/318 |
| 2010/0312100 | A1* | 12/2010 | Zarkh ...................... A61B 6/12 600/424 |
| 2010/0322497 | A1 | 12/2010 | Dempsey et al. |
| 2013/0261429 | A1* | 10/2013 | Lee ........................ A61B 5/055 600/411 |
| 2013/0345545 | A1* | 12/2013 | Gross .................... A61B 5/055 600/411 |
| 2016/0232690 | A1 | 8/2016 | Ahmad |

OTHER PUBLICATIONS

Bilgin, A. et al. "Randomly Perturbed Radial Trajectories for Compressed Sensing MRI." *Proceedings of International Society for Magnetic Resonance in Medicine*.16 (2008):3152.

Blaimer, et al. "Smash, Sense, Pills, Grappa, How to Choose the Optimal Method". Top Magan Reson Imaging, vol. 15, No. 4, Aug. 2004.

Candes, et al. "Robust Uncertainty Principles: Exact Signal Reconstruction from Highly Incomplete Frequency Information." IEEE Transactions on Information Theory, vol. 52, No. 2, Feb. 2006.

Candes, et al. "Sparsity and Incoherence in Compressive Sampling" Nov. 2006.

CIPRA "l1-magic" from SIAM News, vol. 39, No. 9, Nov. 2006.

Donoho, "Compressed Sensing". Sep. 14, 2004.

Foroosh, Hassan, et.al. "Extension of Phase Correlation to Subpixel Registration." *IEEE Transactions on Image Processing*, vol. 11, No. 3, 2002, pp. 188-200.

Greganov, G, et. al. "Portal Image Registration Using the Phase Correlation Method." IEEE Nuclear Science Symposium and Medical Imaging Conference, 2013. [retrieved on Jun. 10, 2014].

Haacke E M et al. "Constrained reconstruction: A superresolution, optimal signal-to-noise alternative to the Fourier transform in magnetic resonance imaging." Medical Physics, AIP, Melville, NY, US, vol. 16, No. 3, May 1, 1989 (May 1, 1989), pp. 388-397, XP000034068, ISSN: 0094-2405, DOI: 10.1118/1.596427.

Hernando, D. et al. "Interventional MRI with sparse sampling: an application of compressed sensing." *Proceedings of International Society for Magnetic Resonance in Medicine*.16 (2008):1482.

Irarrazabal, Pablo, and Dwight G. Nishimura. "Fast Three Dimensional Magnetic Resonance Imaging." *Magnetic Resonance in Medicine*, vol. 33, No. 5, 1995, pp. 656-662.

Lagendijk J. J. et al. "MRI guided radiotherapy: A MRI based linear accelerator." Radiotherapy & Oncology. vol. 56, No. Supplement 1. Sep. 2000. (Sep. 2000):S60-S61. XP008012866. 19th Annual Meeting of the European Society for Therapeutic Radiology and Oncology. Istanbul, Turkey; Sep. 19-23, 2000.

Law, C. , and Glover, G. "Deconvolving Haemodynamic Response Function in fMRI under high noise by Compressive Sampling." *Proceedings of International Society for Magnetic Resonance in Medicine*. 17 (2009):1712.

Li, Kang and Kanadae, Takeo. "Nonnegative Mixed-Norm Preconditioning for Microscopy Image Segmentation." *Information Processing in Medical Imaging*. Springer Berlin Heidelberg.vol. 5636. (2009):362-373.

Lustig, M, et. al. "Faster Imaging with Randomly Perturbed, Undersampled Spirals and |L|_1 Reconstruction." In: *Proceedings of the 13th Annual Meeting of ISMRM*, Miami Beach, 2005.

Lustig, M, et. al. "L1 SPIR-iT: Autocalibrating Parallel Imaging Compressed Sensing." In: *Proceedings of the Seventeenth Meeting of the International Society for Magnetic Resonance in Medicine*. Berkeley, Calif: International Society for Magnetic Resonance in Medicine, 2009 pp. 334.

Meyer, et al. "Fast Spiral Coronary Artery Imaging", Magnetic Resonance in Medicine 28, pp. 202-213 (1992).

Reddy, B. Srinivas, and B. N. Chatterji. "An FFT-Based Technique for Translation, Rotation, and Scale-Invariant Image Registration." *IEEE Transactions on Image Processing*, vol. 5, No. 8, 1996, pp. 1266-1271.

Riek, Jonathan K, et. al. "Flow Compensation in MRI Using a Phase-Corrected Real Reconstruction." *Magnetic Resonance in Medicine*, vol. 30, No. 6, 1993, pp. 724-731.

Roullot E et al. "Regularized reconstruction of 3D high-resolution magnetic resonance images from acquisitions of anisotropically degraded resolutions." Pattern Recognition, 2000. Proceedings. 15th International Conference on Sep. 3-7, 2000; [Proceedings of the International Conference on Pattern Recognition. (ICPR)], Los Alamitos, CA, USA,IEEE Comput. Soc, US, vol. 3, Sep. 3, 2000 (Sep. 3, 2000), pp. 346-349.

Tamada and Kose. "Two-Dimensional Compressed Sensing Using the Cross-sampling Approach for Low-Field MRI Systems." IEEE Transactions on Medical Imaging. vol. 33, No. 9. Sep. 2004. pp. 1905-1912.

Trzasko et al. "Highly Undersampled Magnetic Resonance Image Reconstruction via Homotopic 10-Minimization" IEEE Transactions on Medical Imaging. vol. 28. No. 1. Jan. 31, 2009.

Yang, Junfeng, et. al. "A Fast TVL1-LS Minimization Algorithm for Signal Reconstruction from Rartial Fourier Data." *Technical Report*, TR08-27, CAAM, Rice University Houston, TX, 2008. pp. 1-10.

Zitova, Barbara, and Jan Flusser."Image Registration Methods: A Survey." *Image and Vision Computing*, vol. 21, 2003, pp. 977-100.

Barth, et al. "Simultaneous Multislice (SMS) Imaging Techniques." Magnetic Resonance in Medicine; vol. 75; pp. 63-81; 2016.

Kolbitsch, C. et al; "Cardiac Function Asssesment Without ECG Using Image-based Navigation"; Proceeding of the International Society for Magnetic Resonance in Medincine, 20th Annual Meeting & Exhibition; May 5, 2010; p. 3849; KP040626270; Maelbourne, Australia.

Kolbitsch, C. et al; "Image-based Self-navigator Using Cardiac Functional Parameters for Cine Imaging"; Proceeding of the International Society for Magnetic Resonance in Medincine, 20th Annual Meeting & Exhibition; May 5, 2010; p. 602; KP040623030; Maelbourne, Australia.

Lustig, et al. 'L1 SPIR-IT: Autocalibrating Parallel Imaging Compressed Sensing.'

Paganelli Chiara et al; Liver 4DMRI: A Retrospective Image-based Sorting Method, Medical Physics, AIP; Melville, NY, US; vol. 42; No. 8; Jul. 24, 2015; pp. 4814-4821; XP012199252; ISSN: 0094-2405; DOI: 10.1118/1.4927252 (Retrieved on Jan. 1, 1901); Section 2.B.

PCT App. No. PCT/US2010/039036; International Search Report dated Aug. 11, 2010.

PCT App. No. PCT/US2017/038520; International Search Report and Written Opinion dated Oct. 4, 2017.

Riek, et al. "Flow Compensation in MRI Using a Phase-Corrected Real Reconstruction", 1993.

Smolikova, R. et al.; "Registration of Fast Cine Cardiac MR Slices to 3D Procedural Images: Toward Real Time Registration for MRI-guided Procedures"; Proceedings of SPIE, Medical Imaging 2004; vol. 5370 II; Feb. 16, 2004; pp. 1195-1205; XP040181910; San Diego, CA.

Trasko et al. (Highly Undersampled Magnetic Resonance Image Reconstruction vai Homotopic L0-Minimization, IEEE Transactions on Medical Imaging, Jul. 2, 2008, pp. 1-16). Article previously submitted by Applicant via IDS.

* cited by examiner

|  |  | Volume 1 |  |  | Volume 2 |  |  |
| --- | --- | --- | --- | --- | --- | --- | --- |
| Name | Type | Type | Voxels | Voxel Size [mm] | Type | Voxels | Voxel Size [mm] | Description |
| DS1 | MR to MR | MR | 334×300×80 | 1.5×1.5×3.0 | MR | 334×300×80 | 1.5×1.5×3.0 | Abdomen |
| DS2 | MR to MR | MR | 334×300×80 | 1.5×1.5×3.0 | MR | 334×300×80 | 1.5×1.5×3.0 | Abdomen |
| DS3 | MR to MR | MR | 300×200×162 | 1.5×1.5×1.5 | MR | 300×200×84 | 1.5×1.5×3.0 | Pelvis |
| DS4 | MR to MR | MR | 300×200×162 | 1.5×1.5×1.5 | MR | 200×200×144 | 1.5×1.5×3.0 | Pelvis |
| DS5 | MR to CT | CT | 512×512×103 | 1.2×1.2×3.0 | MR | 160×180×133 | 3.0×3.0×3.0 | Thorax, Abdomen |
| DS5C | MR to CT | CT | 512×512×103 | 1.2×1.2×3.0 | MR | 160×180×133 | 3.0×3.0×3.0 | Thorax, Abdomen |
| DS6 | MR to CT | CT | 512×512×122 | 1.0×1.0×3.0 | MR | 160×144×184 | 1.5×1.5×1.5 | Head, Thorax |
| DS6C | MR to CT | CT | 512×512×122 | 1.0×1.0×3.0 | MR | 160×144×184 | 1.5×1.5×1.5 | Head, Thorax |
| DS7 | MR to CT | CT | 512×512×178 | 1.0×1.0×3.0 | MR | 300×334×190 | 1.5×1.5×1.5 | Thorax, Abdomen |
| DS7C | MR to CT | CT | 512×512×178 | 1.0×1.0×3.0 | MR | 300×334×190 | 1.5×1.5×1.5 | Thorax, Abdomen |
| DS8 | MR to CT | CT | 512×512×166 | 1.0×1.0×3.0 | MR | 300×334×162 | 1.5×1.5×1.5 | Pelvis |
| DS8C | MR to CT | CT | 512×512×166 | 1.0×1.0×3.0 | MR | 300×334×162 | 1.5×1.5×1.5 | Pelvis |

*FIG. 2*

| Name | Registration Grid Voxels | Voxel Size [mm] | PCM CC | PCM MI | Opt. CC | Opt. CC Shift [voxels] | Opt. MI | Opt. MI Shift [voxels] | Opt. MI Time [s] |
|---|---|---|---|---|---|---|---|---|---|
| DS1 | 334×300×90 | 1.5×1.5×3.0 | 0.851 | 0.280 | 0.858 | -1×1×0 | 0.284 | 0×1×-1 | 0.97 |
| DS2 | 334×300×93 | 1.5×1.5×3.0 | 0.886 | 0.270 | 0.889 | 0×-1×0 | 0.282 | 1×-1×0 | 1.27 |
| DS3 | 300×200×84 | 1.5×1.5×3.0 | 0.892 | 0.282 | 0.897 | 0×0×-1 | 0.290 | 0×1×-1 | 0.386 |
| DS4 | 200×266×144 | 1.5×1.5×3.0 | 0.836 | 0.216 | 0.838 | 0×0×0 | 0.219 | 0×0×-1 | 1.41 |
| DS5 | 200×200×133 | 3.0×3.0×3.0 | 0.773 | 0.281 | 0.776 | -1×-0×-2 | 0.282 | 0×0×1 | 0.48 |
| DS5C | 200×200×133 | 3.0×3.0×3.0 | 0.726 | 0.175 | 0.729 | 0×-1×-1 | 0.177 | 1×0×1 | 0.46 |
| DS6 | 336×333×122 | 1.5×1.5×3.0 | 0.680 | 0.199 | 0.683 | -1×0×0 | 0.280 | -1×0×0 | 1.93 |
| DS6C | 336×333×122 | 1.5×1.5×3.0 | 0.686 | 1.507 | 0.705 | -2×-1×0 | 0.162 | 0×0×0 | 1.92 |
| DS7 | 334×334×178 | 1.5×1.5×3.0 | 0.746 | 0.226 | 0.754 | 4×1×0 | 0.261 | 0×0×0 | 3.98 |
| DS7C | 334×334×178 | 1.5×1.5×3.0 | 0.712 | 0.162 | 0.720 | 4×0×1 | 0.173 | 0×0×0 | 3.53 |
| DS8 | 334×334×166 | 1.5×1.5×3.0 | 0.684 | 0.247 | 0.686 | 0×-2×0 | 0.249 | -1×0×0 | 3.69 |
| DS8C | 334×334×166 | 1.5×1.5×3.0 | 0.650 | 0.104 | 0.661 | 0×-2×0 | 0.195 | -1×-1×0 | 3.70 |

FIG. 8

| Name | ΔCC [%] | ΔMI [%] | Time [s] | Speedup |
|---|---|---|---|---|
| DS1 | 0.24 | -0.38 | 0.19 | 8.1 |
| DS2 | 0.26 | -0.26 | 0.23 | 5.5 |
| DS3 | 0.51 | 2.31 | 0.11 | 3.5 |
| DS4 | -0.13 | 0.49 | 0.27 | 5.2 |
| DS5 | -1.79 | -10.21 | 0.15 | 3.2 |
| DS5C | -0.92 | -2.91 | 0.16 | 3.1 |
| DS6 | -1.73 | -2.13 | 0.32 | 6.0 |
| DS6C | 1.41 | 2.49 | 0.32 | 6.0 |
| DS7 | -0.19 | 0.42 | 0.63 | 5.9 |
| DS7C | 0.31 | 1.12 | 0.63 | 5.6 |
| DS8 | -2.96 | -6.45 | 0.64 | 5.8 |
| DS8C | -3.07 | -5.96 | 0.64 | 5.8 |

*FIG. 9*

SINGLE- AND MULTI-MODALITY ALIGNMENT OF MEDICAL IMAGES IN THE PRESENCE OF NON-RIGID DEFORMATIONS USING PHASE CORRELATION

CROSS-REFERENCE TO RELATED APPLICATION

This application claims priority under 35 U.S.C. § 119(e) to U.S. provisional application No. 61/911,379 filed 3 Dec., 2013, the disclosure of which is incorporated by reference herein.

TECHNICAL FIELD

The subject matter described herein relates to use of phase correlation as a tool for single- and multi-modality translational alignment of medical images in the presence of non-rigid deformations.

BACKGROUND

Translational image alignment is a fundamental and commonly used preprocessing step in many medical imaging operations, such as image registration, image fusion, multiframe imaging, etc. In many applications, it can be crucial that the alignment algorithm is fast and robust to noise. The problem of image alignment becomes even more challenging when there are small deformations present in the images (for example, deformations due to patient breathing and organ movement) or when different types of imaging modalities produce the two images being registered. In such cases, intensity-based similarity measures can exhibit non-convex behavior, which renders the problem difficult for optimization. An example of such difficulties is illustrated in of FIG. 1, which shows a graph 100 depicting values of a cross correlation similarity measure as a function of the translational shift along the patient axis for a pair of images of the pelvis area of a patient's body. The graph 100 of FIG. 1 shows, among other things, how the presence of local maxima can cause difficulties in solving for the global maximum with gradient based optimization approaches.

SUMMARY

Consistent with implementations of the current subject matter, a phase correlation method (PCM) can be used reliably for translational and/or rotational alignment of 3D medical images in the presence of non-rigid deformations in the datasets.

In one aspect, a method includes comparing a first medical image of a first registered volume of a patient taken at a first time and a second medical image of a second registered volume of the patient taken at a second time using a phase correlation method. The comparing includes calculating at least one of a translation and a rotation required to properly align the first and second medical images in a common registration grid. The method further includes determining a change to at least one of a physical location and a physical orientation of the patient based on the calculating. The change corrects a second position of the patient as imaged in the second image to more closely conform to a first position of the patient imaged in the first image. The change is outputted.

In optional variations, one of more of the following features can be included in any feasible combination. The first image and the second image can be obtained using a same imaging modality or differing imaging modalities. The first registered volume and the second registered volume can be downsampled to create the common registration grid having a lower resolution than either of the first registered volume and the second registered volume. Alternatively or in addition, a determination can be made that the first registration volume and the second registration volume include different resolutions, and the first registration volume and/or the second registration volume can be resampled on the common registration grid. A common resolution along each dimension of the common registration grid can be set to a coarser of a first initial resolution of the first registered volume and a second initial resolution of the second registered volume.

The comparing can include identifying a peak in a normalized cross-power spectrum of the first registered volume and the second registered volume. The identifying of the peak in the normalized cross-power spectrum can include finding a maximum intensity of a Fourier transform of the normalized cross-power spectrum and selecting, from a plurality of voxels having intensities greater than a threshold, a voxel for which a sum of voxel intensities of neighboring voxels around the voxel is highest. The neighboring voxels can be in a window defined as a fraction of a number of voxels along each dimension of the common registration grid. The method can further include refining a position of the peak by calculating a centroid of the voxel intensities of the neighboring voxels.

In some variations, the change can be applied to the physical location and/or the physical orientation of the patient, and a medical procedure can be performed on the patient after applying the change. The medical procedure can include at least one of a radiation treatment and a surgical procedure.

Systems and methods consistent with this approach are described as well as articles that comprise a tangibly embodied machine-readable medium operable to cause one or more machines (e.g., computers, etc.) to result in operations described herein. Similarly, computer systems are also described that may include a processor and a memory coupled to the processor. The memory may include one or more programs that cause the processor to perform one or more of the operations described herein.

A system consistent with implementations of the current subject matter can optionally include one or more imaging devices (e.g. MR, CT, or the like) for generating the first and second medical images. A system need not include such devices. For example, the first and second medical images can be generated by other imaging devices and the images (or at least one or more datasets representing the images) can be transferred to computer hardware executing the operations described herein.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 2 shows a table of parameters for example registration datasets;

FIG. 8 shows a table listing registration results for the datasets listed in the table of FIG. 2;

FIG. 9 shows a table containing results obtained with downsampled volumes using a downsampling factor of 2 for each dimension consistent with implementations of the current subject matter.

When practical, similar reference numbers denote similar structures, features, or elements.

DETAILED DESCRIPTION

Figure 1:
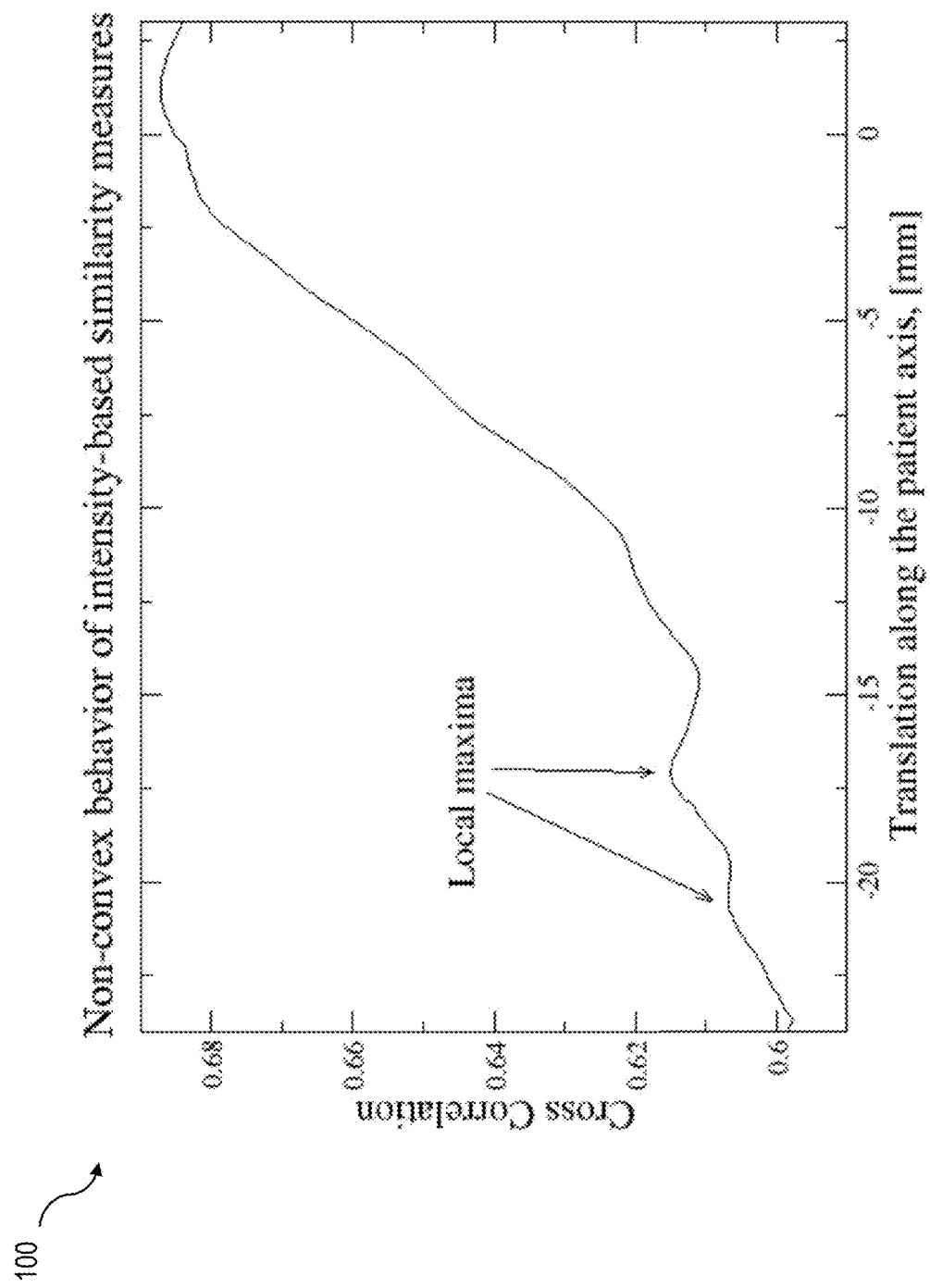
FIG. 1 shows a graph depicting values of a cross correlation similarity measure as a function of the translational shift along the patient axis for a pair of images of the pelvis area of a patient's body.

Approaches consistent with the current subject matter can be used for single-modality as well as for multi-modality image registration, for example for registration of two images captured using a same or differing modalities, where possible modalities include but are not limited to magnetic resonance (MR), computed tomography (CT), and the like. Registration quality can be quantified using cross correlation (CC) and mutual intensity (MI) intensity-based similarity measures (SM) as registration cost functions. The cost function values obtained with a PCM consistent with implementations of the current subject matter are comparable to optimum values found with an exhaustive search and yield good agreement. The obtained PCM shifts can closely match optimum shifts found using an exhaustive search, both for single-modality (e.g. MR to MR, CT to CT, etc.) registrations and multi-modality (e.g. MR to CT, or the like) registrations. Accordingly, a PCM consistent with implementations of the current subject matter can be an efficient and robust method for coarse image alignment with pixel-level accuracy. The simplicity of the algorithm, together with its small computational complexity, can make it an advantageous choice as a tool for fast initial alignment in medical image processing.

The phase correlation method (PCM) is an efficient and robust to noise algorithm for image alignment, which was originally used to estimate translational integer-pixel shifts between displaced images. Later, the algorithm was extended to also work with rotated and scaled 2D images by using a log-polar transform of the images. Similar generalizations of the PCM for combined translation, rotation and scaling estimation in the 3D case are not possible, since there is no coordinate transformation that converts rotation to translation in the 3D case. However, the method was extended to register 3D translated and rotated volumes by utilizing the pseudopolar Fourier transform and, alternatively, by applying an iterative optimization procedure called cylindrical phase correlation method (CPCM). In the latter approach, the rotation angle around different axes is iteratively estimated by applying the PCM to cylindrically mapped images.

Consistent with implementations of the current subject matter, application of the PCM in its original form is used for reliably and relatively computationally inexpensively aligning pairs of 3D volumes that are not only translated, but also deformed with respect to each other. The algorithm produces very good results when applied to multi-modality MR/CT image registration and can provide near-optimum results in terms of two commonly used intensity-based similarity measures. The differences between the optimum shift (e.g. one found by an exhaustive search) and a shift identified by a PCM consistent with implementations of the current subject matter are small. Use of the current subject matter can further broaden the application of the PCM in clinical practice of alignment of two or more medical images.

The Phase Correlation Method (PCM) is based on the fundamental Fourier shift theorem. The theorem states that delaying (shifting) the signal f(t) with an interval τ is equivalent to multiplying the signal's Fourier transform, F(ω), by $e^{-i\omega\tau}$, for example as expressed in equation 1:

$$f(t-\tau) = e^{-i\omega\tau} F(\omega) \qquad (1)$$

Therefore, if two volumes A and B are shifted versions of each other (i.e. B=$(\vec{x}-\vec{\Delta})$=A$(\vec{x})$), their normalized cross-power spectrum, Q$(\vec{k})$, simplifies to an expression such as that in equation 2:

$$Q(\vec{k}) = \frac{F_A(\vec{k}) F_B^*(\vec{k})}{|F_A(\vec{k}) F_B^*(\vec{k})|} = \frac{F_A(\vec{k}) F_A^*(\vec{k}) e^{i\vec{k}\cdot\vec{\Delta}}}{|F_A(\vec{k}) F_A^*(\vec{k}) e^{i\vec{k}\cdot\vec{\Delta}}|} = e^{i\vec{k}\cdot\vec{\Delta}} \qquad (2)$$

where $F_A(\vec{k})$ and $F_B(\vec{k})$ are the Fourier transforms of the images A and B, and $F^*_B(\vec{k})$ is the complex conjugate of $F_B(\vec{k})$. Calculating the inverse Fourier transform q$(\vec{x})$ of the normalized cross-power spectrum gives a Kronecker delta function, centered exactly at the displacement, $\vec{\Delta}$, which is the peak of the normalized cross-power spectrum. The Kronecker delta function can be expressed as in equation 3:

$$q(\vec{x}) = \delta(\vec{\Delta}) \qquad (3)$$

In the ideal case of a second image B being a translated replica of a first image A, the position of the peak identifies the exact translational misalignment between the images. However, due to noise and/or deformations normally being present in real images, the peak is usually spread around neighboring voxels. Also, aliasing artifacts and edge effects can additionally degrade the quality of the peak. Previously available approaches for improving the clarity and sharpness of the PCM peak and for reaching sub-pixel accuracy generally cannot be applied directly for the case of deformed volumes and multi-modality image registration, since the basic assumption of the approaches, that the two images being registered are identical (to the extent of some random noise being present in both images), is not valid. Therefore, for registration applications in medical imaging, pixel-level alignment accuracy may be considered. In one implementation consistent with the current subject matter, the position of the peak can be identified with a simple thresholding technique as discussed in more detail below.

The table of parameters 200 reproduced in FIG. 2 shows various information about registration datasets used in experimental validation of aspects of the current subject matter. The first column contains the identification name of the dataset, the second column contains the type of registration for the corresponding data set, the "Volume1" and "Volume2" columns contain information about the two 3D volumes being registered (imaging modality, number of voxels and voxel size), and the last column gives information about which part of the anatomy of the patient was scanned. All datasets are obtained from real scans of human patients. Each dataset contains a pair of two misaligned 3D volumes, obtained in two different scans of the same patient. The different datasets cover different portions of the patient's body and can exhibit large translational displacements in all three directions. Scans of the thorax and the abdomen portions are also subjected to deformations due to patient breathing and movement. In some of the datasets, the imaging modalities used for the two scans differ.

The performance of the PCM used in a manner consistent with implementations of the current subject matter to align misaligned images was investigated in three scenarios, which are discussed in more detail below. In the first scenario, the PCM is used to align deformed volumes obtained with the same imaging modality (datasets "DS1", "DS2", "DS3" and "DS4" in the table 200 of FIG. 2). All of these datasets were produced via MR scans. In the second scenario, the PCM is used to register multi-modality MR/CT pairs (datasets "DS5", "DS6", "DS7" and "DS8" in the table 200 of FIG. 2). In the MR scans, the couch and the head support on which the patient is laying are not visible. In order to eliminate any effects due to the presence of these objects in the CT data, they were cropped out manually from the CT scans. The effect on the registration results attributable to the couch and the head support being present in the CT scans is investigated in the third scenario (datasets "DS5C", "DS6C", "DS7C" and "DS8C" in the table 200 of FIG. 2). The datasets are practically identical to the datasets used in the second scenario, except that in this case the couch and the head support are not cropped out from the CT scans.

Due to the deformations present in the registration datasets, it is difficult to define the optimal alignment shifts for the datasets used in this work. Therefore, to evaluate the accuracy of the PCM registration, two similarity measures are used as registration cost functions: the cross correlation coefficient (CC) and the mutual information (MI) between the two volumes A and B, for example as expressed in equations 4 and 5:

$$CC = \frac{\sum_i (A_i - \overline{A})(B_i - \overline{B})}{\sqrt{\sum_i (A_i - \overline{A})^2 \sum_i (B_i - \overline{B})^2}} \quad (4)$$

$$MI = \sum_i \sum_j P(A_i, B_j) \log \frac{P(A_i, B_j)}{p(A_i)p(B_j)} \quad (5)$$

Here, $A_i$ and $B_i$ are the image intensities of the i-th voxel in the volumes A and B, $P(A_i, B_j)$ is the joint probability density function of the voxel intensities in the two volumes, and $p(A_i)$ and $p(B_j)$ are the marginal probability density functions of A and B respectively. A histogram with 16×16 bins was used to evaluate $P(A_i, B_j)$. ☐ The obtained similarity measures after applying the shift from the PCM are compared to the optimum (maximum) values of the measures found with an exhaustive search on a large grid of shifts around the PCM shift. The CC and MI registration metrics were selected for the purposes of this work. The CC metric is generally suitable for single-modality image registration, while the MI metric is more appropriate for multi-modality registration.

In an implementation, a PCM algorithm consistent with implementations of the current subject matter can be implemented in software (e.g. C++ or the like). The fast Fourier transformations (FFTs) can be performed using the FFTW3 library. If the first and second registered volumes in the first and second images have different resolutions (e.g. different numbers of voxels and/or different voxel sizes), the registered volumes can be resampled on a common registration grid. The resolution along each dimension of the common registration grid is set to the coarser resolution for that dimension among the two initial resolutions (e.g. a first initial resolution of the first registered volume or a second initial resolution of the second registered volume). The resampling can be performed using trilinear interpolation. The resampling and the 3D FFTs can be multi-threaded to speed up the execution. Other computational approaches are within the scope of the current subject matter.

Some implementations can involve an optional preprocessing step in which the skin surface of the patient is identified in each of the two registered volumes in the registration dataset, before applying the PCM. All voxels that are outside of the surface can be zeroed to reduce the influence of noise and other artifacts on the registration results. The skin surface can be automatically detected by applying a marching squares algorithm to all transverse slices of the volumes. The isosurface for the marching squares algorithm can be set to 0.5 times the average intensity of the voxels in volume.

The identification of the peak in the matrix $q(\vec{x})$ (see equation 3) can be performed by first finding the maximum intensity, $q_{max}$. Then, among all voxels with intensity greater than a threshold (e.g. $0.9 \times q_{max}$), the voxel for which the sum of voxel intensities in a small window around that voxel (e.g. neighboring voxels) is highest can be selected. The size of the window is $(wN_x) \times (wN_y) \times (wN_z)$ where $w=0.05$ (or some other fraction) and $N_x$, $N_y$, and $N_z$ are the number of voxels along each dimension of the registration grid. The position of the peak (i.e. the translational shifts) can be further refined by calculating the centroid of the voxel intensities in the matrix $q(\vec{x})$ inside the window.

Performance of PCM registration for the illustrative examples can be first evaluated by visually inspecting the registered volumes. To perform the inspection, the two volumes are overlaid on a common grid. The first volume is plotted in a first color (e.g. red) and the second volume is plotted in a second color (e.g. green). In this way, overlapping areas reflect a blend of the colors, while areas of mismatch are visible in either of the first and second colors. Some examples of the PCM registration are depicted in FIG. 3, FIG. 4, and FIG. 5.

Figure 3:
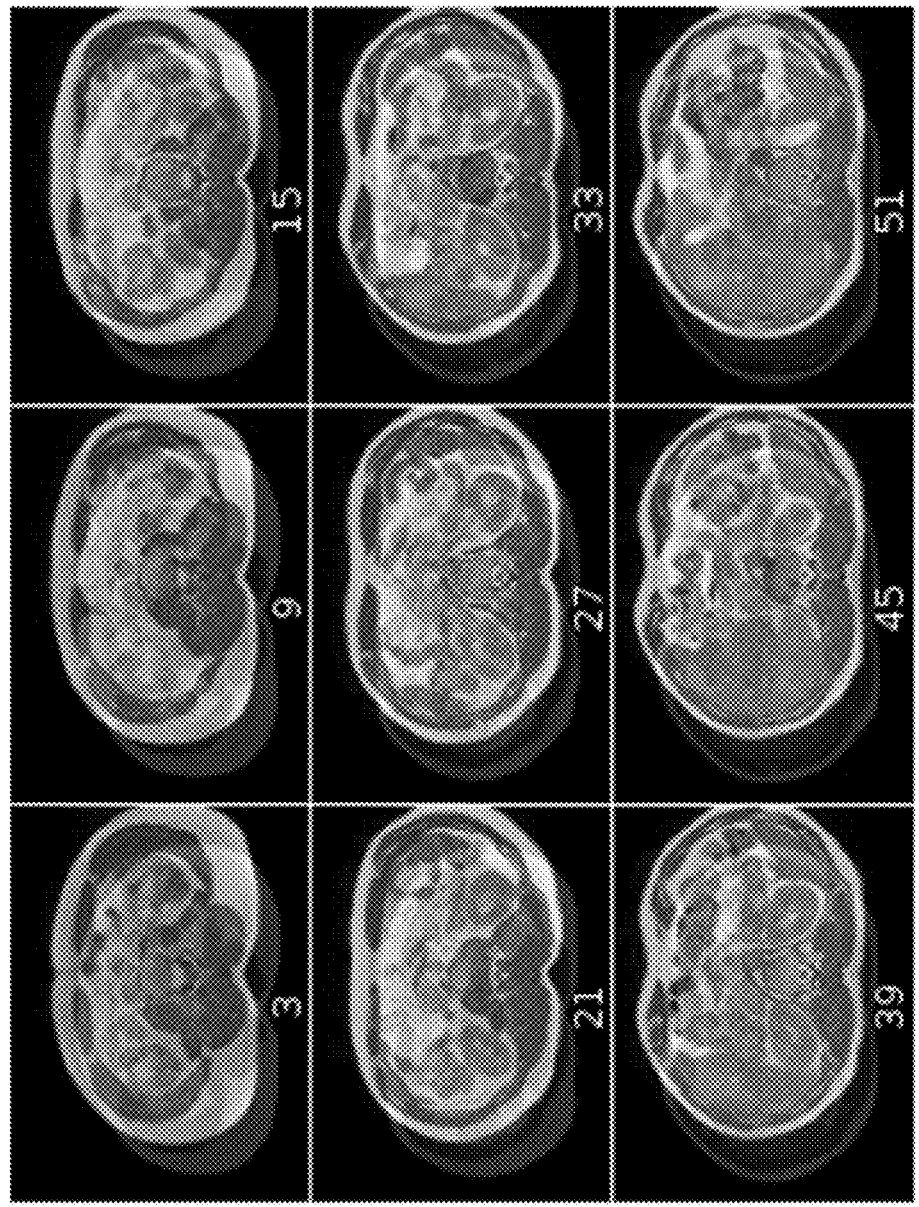
FIG. 3 shows a series of images illustrating translational alignment of a single-modality MR dataset using a PCM approach consistent with implementations of the current subject matter depicting initial position of the volumes (e.g. misaligned along the patient axis) before the PCM registration.
Figure 4:
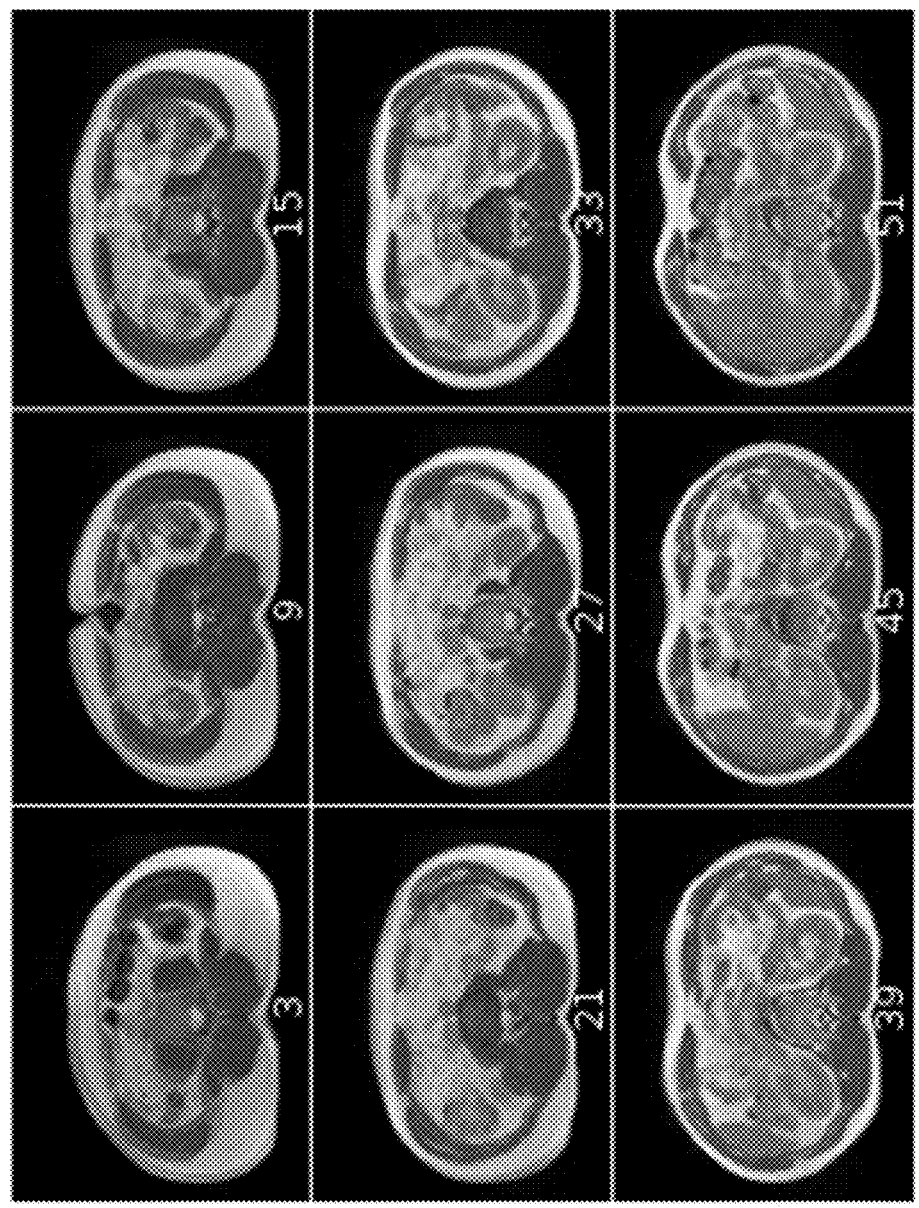
FIG. 4 shows a series of images illustrating translational alignment of a single-modality MR dataset using the PCM approach consistent with implementations of the current subject matter depicting the registered volumes after applying the PCM shift.

FIG. 3 shows a series of images 300 illustrating translational alignment of a single-modality MR dataset using a PCM approach consistent with implementations of the current subject matter, where 9 transverse slices of the two 3D volumes in the dataset (slice numbers are shown at the bottom of each slice) are shown overlaid. The series 300 shows the initial positions of the two volumes (e.g. misaligned along the patient axis) before PCM registration consistent with implementations of the current subject matter is applied. FIG. 4 shows a second image series 400 in which the registered volumes are better aligned after applying the PCM shift consistent with implementations of the current subject matter. As shown in FIG. 3 and FIG. 4, the two volumes are aligned very well after registration, except for the areas of small deformations, which cannot be registered with simple rigid translations.

Figure 5:
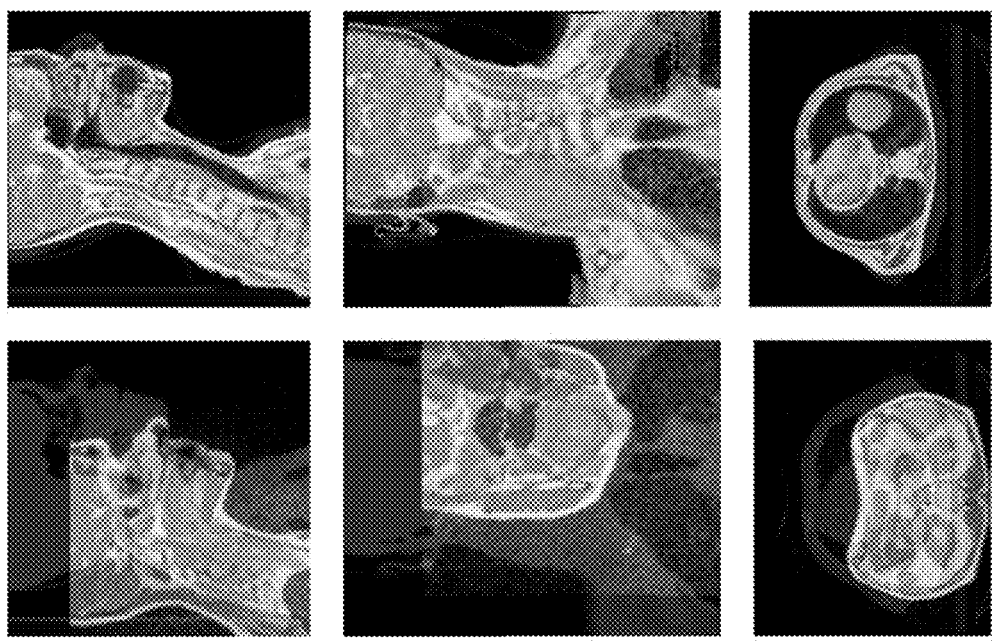
FIG. 5 shows a series of images illustrating translational alignment of a multi-modality MR/CT dataset consistent with implementations of the current subject matter.

FIG. 5 shows a series of images 500 illustrating an example of a multi-modality MR to CT registration. The series 500 shows sagital, coronal and transverse slices, before and after the PCM registration. This example illustrates the good performance of a PCM approach consistent with implementations of the current subject matter for cases in which the two volumes are strongly misaligned. Note that even though the CT couch and head support are not cropped out from the CT scan, the PCM approach consistent with implementations of the current subject matter nonetheless provides very good registration results. Similar results were obtained for all other tested datasets. From the visual inspection, it is evident that the PCM registration finds a nearly-optimum translational shift for registering the volumes.

Figure 6:
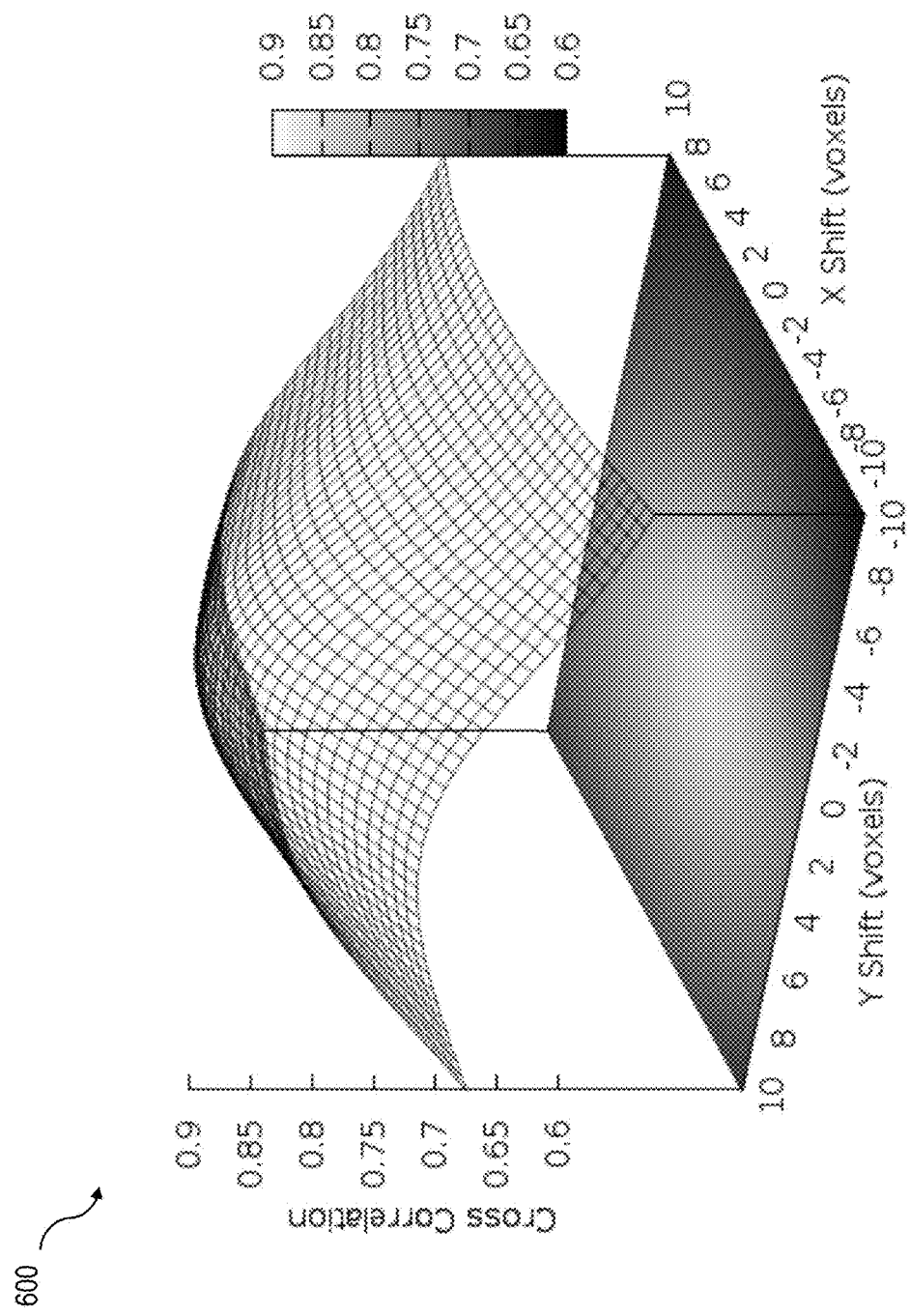
FIG. 6 and FIG. 7 show graphs depicting behavior of the CC and MI registration cost functions around a PCM shift obtained consistent with implementations of the current subject matter.
Figure 7:
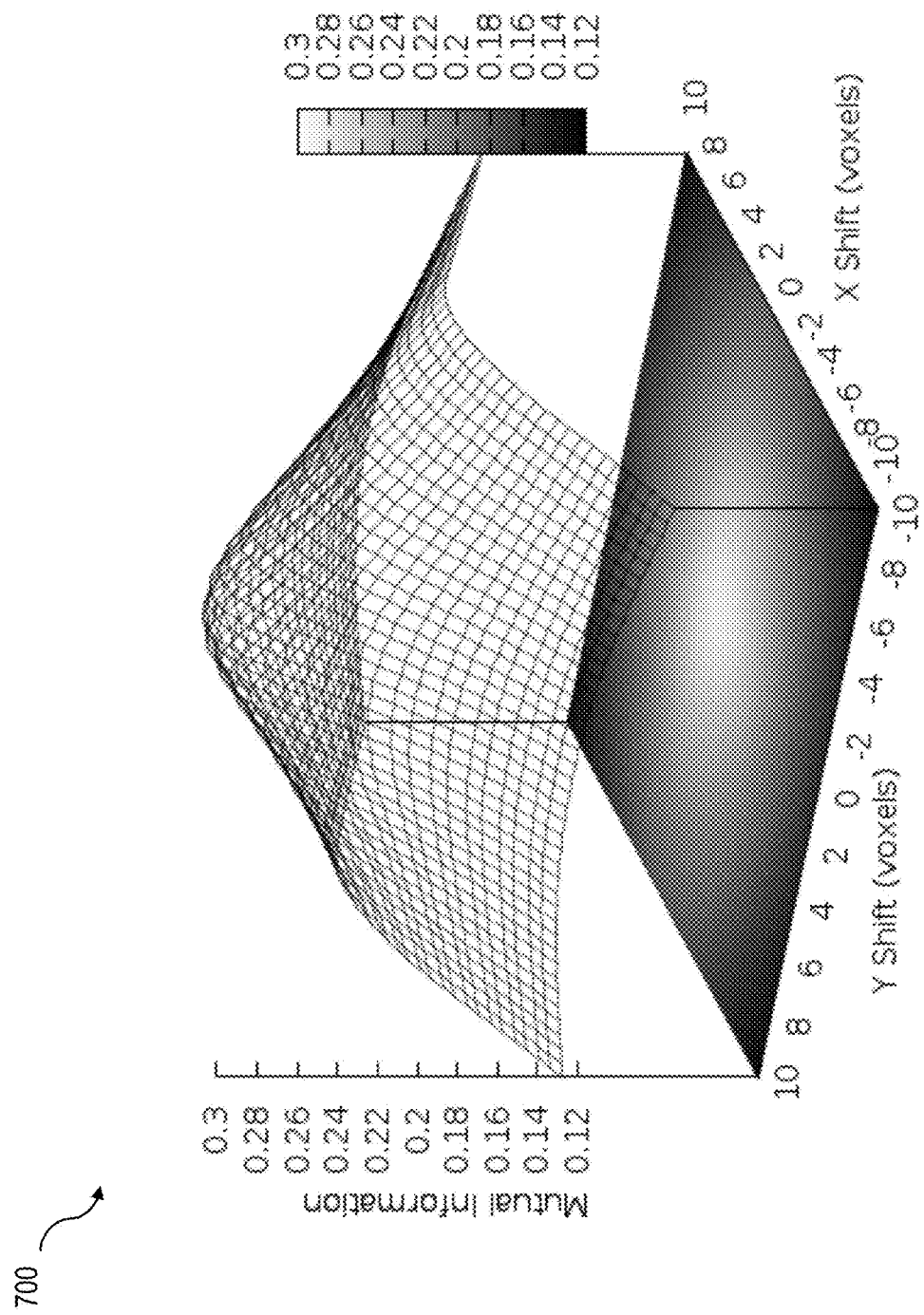

To compare the obtained shifts with the best shifts possible (in terms of the registration cost functions), an exhaustive search over the shift parameters can be performed. FIG. 6 and FIG. 7 show charts 600, 700 illustrating the typical behavior of the CC and MI registration cost function for different transverse shifts, relative to the shift found by a PCM approach consistent with implementations of the current subject matter (hereafter, referred to as "the PCM shift"). The axes in the charts 600, 700 correspond to the additional shift being applied to the registered volumes after the initial translation found by the PCM approach of the current subject matter. To produce the charts 600, 700 of FIG. 6 and FIG. 7, the two cost functions were calculated for transverse shifts on a 10×10 voxel grid with a step of 0.5 voxels. The coordinates of the points in the charts 600, 700 correspond to the additional shifts being added to the initial PCM shift.

The registration results for all tested datasets are summarized in the table 800 of FIG. 8, which shows the CC and MI values for the shift found by the PCM. The table 800 also contains information about the optimum values of the CC and MI similarity measures, which were found by the exhaustive search approach around the initial PCM shift. The first column contains the identification name of the dataset, the second column contains information about the size of the registration grid on which the original volumes are resampled, the third and fourth columns show the values of the similarity measures after applying the obtained PCM shift, the next columns show the additional shifts (that need to be added to the PCM shift) and the corresponding optimum values of the similarity measures obtained with exhaustive search around the PCM shift, and the last column contains the execution times of the developed algorithm.

The optimum shifts shown in the table are the additional shifts that need to be added to the PCM shift, in order to obtain the optimum values of the similarity measures. It can be seen that the shifts obtained with the PCM registration approach consistent with implementations of the current subject matter are very close to the optimum shifts. In many cases, the PCM shift in the transverse plane is within 1 voxel (1.5 mm) from the optimum shift. Considering the CC metric in the single-modality cases and the MI metric in the multi-modality cases, for nine out of the twelve example datasets there is a perfect alignment along the patient axis. The obtained cost function values are generally within 1.5% from the optimum values. The largest deviations from the optimum shifts are observed for the thorax-abdomen datasets ("DS5", "DS5C", "DS7" and "DS7C"). Visual inspection of these particular cases reveals that, due to large deformations in this area of the patient's body, simple translations may not be enough to obtain good alignment of the entire volumes in some cases. Both a PCM shift approach consistent with implementations of the current subject matter and the optimum shifts may provide only partial alignments of different sections of the anatomy in these cases.

The total execution time of the algorithm for each dataset is shown in the last column in the table 800 of FIG. 8. The performance of the algorithm in terms of execution speed can be further improved by downsampling the initial 3D volumes to a lower resolution grid and applying the PCM approach consistent with implementations of the current subject matter to the downsampled volumes.

The table 900 of FIG. 9 contains the registration results obtained with downsampled volumes. The ΔCC and ΔMI columns show the relative difference between the corresponding registration cost functions obtained with and without the downsampling step-positive values indicating improved performance when the downsampling is used, and the last two columns show the execution times when the downsampling is performed and the corresponding speedup factor, compared to the timing results without downsampling. The downsampling factor for each dimension is 2 in this example. Downsampling the volumes can improve the execution speed by a factor of approximately 3 to 8 in at least some cases, depending on the size of the registration grid. The downsampling does not significantly degrade the quality of the registration and in some cases better results are observed. This effect can be explained by the lower noise level in the resampled volume, due to the averaging of nearby voxel intensities.

Figure 10:
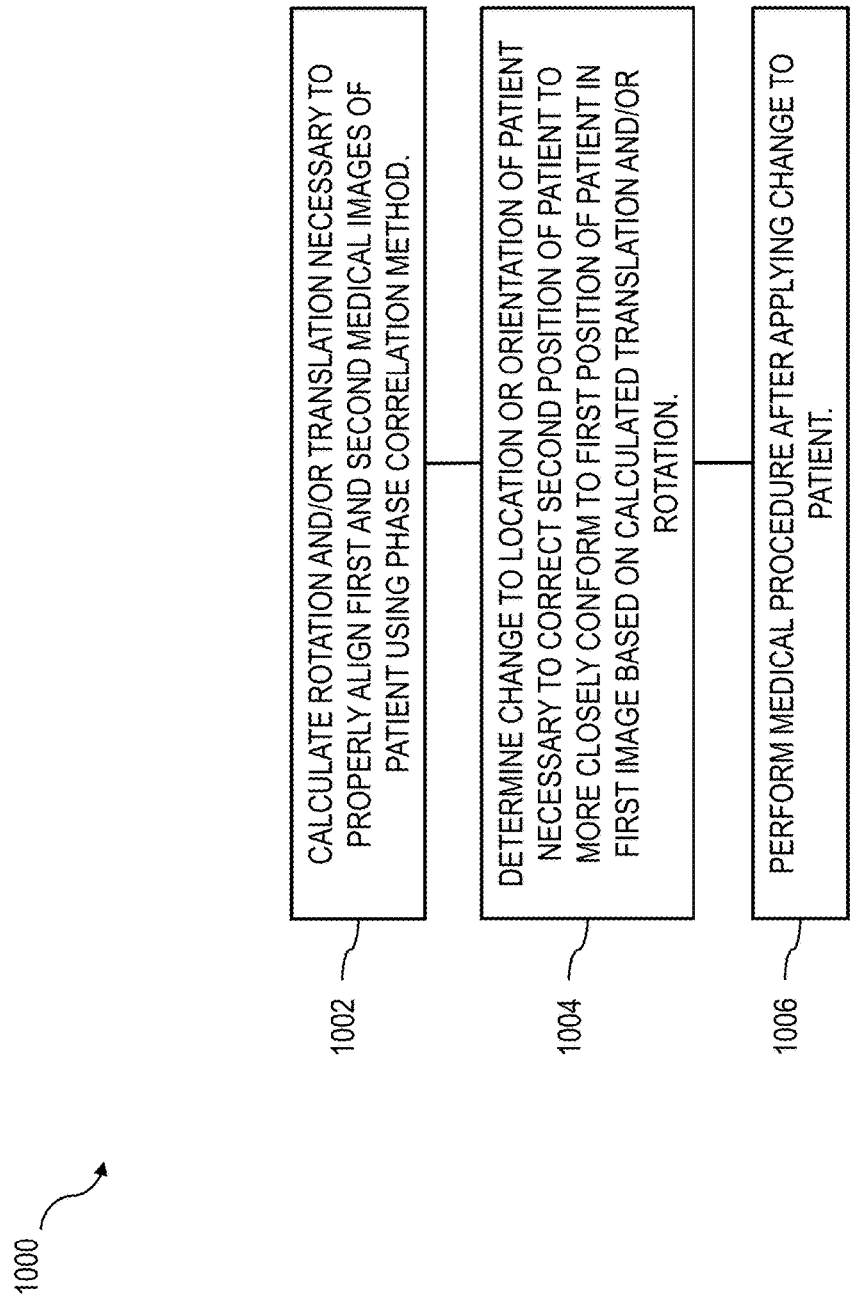
FIG. 10 shows a process flow diagram illustrating aspects of a method having one or more features consistent with implementations of the current subject matter.

FIG. 10 shows a process flow chart 1000 illustrating features that can be included in a method consistent with an implementation of the current subject matter. At 1002 a first medical image of a first registered volume of a patient taken at a first time and a second medical image of a second registered volume of the patient taken at a second time are compared using a phase correlation method to calculate at least one of a translation and a rotation required to properly align the first and second medical images. At 1004, a change to at least one of a physical location and a physical orientation of the patient is determined for correcting a second position of the patient to more closely conform to a first position of the patient in the first image. The change is determined based on the calculated translation and/or the rotation required to properly align the first medical image and the second medical image. The change can be outputted, for example by displaying one or more parameters to a technician or other user. The displaying can occur via a printout, a display device, or the like. In other examples, the outputting of the change can include commands to automatically translate and/or rotate a patient, for example by causing movement of a patient couch or bed upon which the patient rests. At 1006, a medical procedure can optionally be performed on the patient after applying the determined change to the physical location and/or the physical orientation of the patient. The medical procedure can include radiation treatment, a surgical procedure, or the like.

As an example, a patient undergoing radiation treatment can be imaged before, during, after, etc. delivery of a first radiation fraction. The resulting image can be considered the first medical image. Prior to a second radiation fraction delivery to the patient, the patient can be imaged to produce the second medical image. Approaches discussed herein can be used to determined translational and/or rotational movements of the patient necessary to place the patient in a same location and orientation for the second radiation fraction delivery as for the first radiation fraction delivery.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs, which can also be referred to programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like. A computer remote from an analytical system (e.g. an imaging system) can be linked to the analytical system over a wired or wireless network to enable data exchange between the analytical system and the remote computer (e.g. receiving data at the remote computer from the analyzer and transmitting information such as calibration data, operating parameters, software upgrades or updates, and the like) as well as remote control, diagnostics, etc. of the analytical system.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:
1. A method comprising:
 receiving, from at least one of an MRI imaging device or a CT imaging device, a first medical image of a first registered volume of a patient taken at a first time and at a first position and a second medical image of a second registered volume of the patient taken at a second time and at a second position;

comparing the first medical image and the second medical image using a phase correlation method, the comparing comprising:
 identifying a peak in a normalized cross-power spectrum of the first registered volume and the second registered volume;
 finding a maximum intensity of a Fourier transform of the normalized cross-power spectrum;
 selecting, from a plurality of voxels having intensities greater than a threshold, a voxel for which a sum of voxel intensities of neighboring voxels around the voxel is highest; and
 calculating, based at least on the voxel, at least one of a translation and a rotation required to properly align the first and second medical images in a common registration grid;
determining, based on the calculating, a change to at least one of a physical location and a physical orientation of the patient; and
correcting, based on the determined change, the second position of the patient to more closely conform to the first position of the patient.

2. A method as in claim 1, further comprising downsampling the first registered volume and the second registered volume to create the common registration grid having a lower resolution than either of the first registered volume and the second registered volume.

3. A method as in claim 1, further comprising:
determining that the first registered volume and the second registered volume comprise different resolutions; and
resampling the first registered volume and/or the second registered volume on the common registration grid.

4. A method as in claim 3, wherein a common resolution along each dimension of the common registration grid is set to a coarser of a first initial resolution of the first registered volume and a second initial resolution of the second registered volume.

5. A method as in claim 1, wherein the neighboring voxels are in a window defined as a fraction of a number of voxels along each dimension of the common registration grid.

6. A method as in claim 1, further comprising refining a position of the peak by calculating a centroid of the voxel intensities of the neighboring voxels.

7. A method as in claim 1, further comprising:
applying the change to the physical location and/or the physical orientation of the patient; and
performing a medical procedure on the patient after applying the change.

8. A method as in claim 7, wherein the medical procedure comprises at least one of a radiation treatment and a surgical procedure.

9. A method as in claim 1, wherein the first image and the second image are obtained using a same imaging modality.

10. A method as in claim 1, wherein the first image and the second image are obtained using different imaging modalities.

11. A computer program product comprising a non-transitory machine-readable medium storing instructions that, when executed by at least one programmable processor, cause the at least one programmable processor to perform operations comprising:
receiving, from at least one of an MRI imaging device or a CT imaging device, a first medical image of a first registered volume of a patient taken at a first time and a first position and a second medical image of a second registered volume of the patient taken at a second time and a second position;
comparing the first medical image and the second medical image using a phase correlation method, the comparing comprising:
 identifying a peak in a normalized cross-power spectrum of the first registered volume and the second registered volume;
 finding a maximum intensity of a Fourier transform of the normalized cross-power spectrum;
 selecting, from a plurality of voxels having intensities greater than a threshold, a voxel for which a sum of voxel intensities of neighboring voxels around the voxel is highest; and
 calculating, based at least on the voxel, at least one of a translation and a rotation required to properly align the first and second medical images in a common registration grid;
determining, based on the calculating, a change to at least one of a physical location and a physical orientation of the patient; and
correcting, based on the determined change, the second position of the patient to more closely conform to the first position of the patient.

12. A computer program product as in claim 11, wherein the operations further comprise downsampling the first registered volume and the second registered volume to create the common registration grid having a lower resolution than either of the first registered volume and the second registered volume.

13. A computer program product as in claim 11, wherein the operations further comprise:
determining that the first registered volume and the second registered volume comprise different resolutions; and
resampling the first registered volume and/or the second registered volume on the common registration grid.

14. A system comprising:
computer hardware configured to perform operations comprising:
 receiving, from at least one of an MRI imaging device or a CT imaging device, a first medical image of a first registered volume of a patient taken at a first time and a first position and a second medical image of a second registered volume of the patient taken at a second time and a second position;
 comparing the first medical image and the second medical image using a phase correlation method, the comparing comprising:
  identifying a peak in a normalized cross-power spectrum of the first registered volume and the second registered volume;
  finding a maximum intensity of a Fourier transform of the normalized cross-power spectrum;
  selecting, from a plurality of voxels having intensities greater than a threshold, a voxel for which a sum of voxel intensities of neighboring voxels around the voxel is highest; and
  calculating, based at least on the voxel, at least one of a translation and a rotation required to properly align the first and second medical images in a common registration grid;
 determining, based on the calculating, a change to at least one of a physical location and a physical orientation of the patient; and correcting, based on the determined change, the second position of the patient to more closely conform to the first position of the patient.

15. A system as in claim 14, further comprising at least one imaging device for generating the first and second medical images.

16. A system as in claim 14, the calculating further comprising performing a three-dimensional Fourier transform on at least one of the first medical image or the second medical image, wherein the first medical image is a three-dimensional image of the first registered volume of the patient and the second medical image is a three-dimensional image of the second registered volume of the patient.

17. A method as in claim 1, the phase correlation method comprising generating a cross-power spectrum of the first medical image and the second medical image and the calculating of the at least one of the translation and the rotation being based at least on the cross-power spectrum.

* * * * *